United States Patent [19]

Kuhns

[11] Patent Number: 5,361,724
[45] Date of Patent: Nov. 8, 1994

[54] EXPANDABLE BALE CARRIER AND FEEDER

[75] Inventor: Abe B. Kuhns, Arthur, Ill.

[73] Assignee: E-Z Trail, Inc., Arthur, Ill.

[21] Appl. No.: 877,414

[22] Filed: May 1, 1992

[51] Int. Cl.$^5$ .............................................. A01K 1/10
[52] U.S. Cl. .................................................... 119/60
[58] Field of Search ..................... 119/58, 59, 60, 52.1

[56] References Cited

U.S. PATENT DOCUMENTS

| | | | |
|---|---|---|---|
| 3,906,902 | 9/1975 | Rose | 119/60 |
| 3,913,529 | 10/1975 | Leigh, Jr. | 119/60 |
| 4,078,523 | 3/1978 | Etzler | 119/58 |
| 5,205,241 | 4/1993 | Halpin et al. | 119/60 |

FOREIGN PATENT DOCUMENTS

| | | | |
|---|---|---|---|
| 1602111 | 11/1981 | United Kingdom | 119/60 |
| 2154418 | 9/1985 | United Kingdom | 119/60 |

OTHER PUBLICATIONS

"*Bomar Bale Master*", undated.
*Apache Feeder Wagon*, undated.
*Port-A-Feeder by Precision*, undated.
*K & K Manufacturing*, undated.
*S. I. Feeders*, 1989.
*H&S Bunk Feeders*, undated.
*Meyer's Steel Bunk Feeder*, undated.
*The Cattle Buffet*, Schilling Systems Ltd., 1989.

Bomar Round Bale & Feeder, photographs, undated.

*Primary Examiner*—Gene Mancene
*Assistant Examiner*—Thomas Price
*Attorney, Agent, or Firm*—Lockwood, Alex, Fitzgibbon & Cummings

[57] ABSTRACT

An expandable hay bale carrier and feeder and flexible vehicle for feeding livestock include a wheeled chassis with a bed thereon for supporting the bales, a pair of spaced end walls and a pair of spaced side walls. The side walls are mounted by a telescopically slidable assembly to move transversely of the bed between a first maximum width position spaced from the end walls and a second minimum width position adjacent the end walls. As the livestock feed and reach for more hay the force which they exert against the side walls automatically moves the side walls toward the minimum width position as the hay is consumed, and the respective ends of the side walls may move independently of each other to compensate for unequal consumption of the hay. The side walls may be opened to permit the loading and unloading of the hay bales and the livestock may feed from all sides of the feeder. The chassis is flexible to permit it to twist about a longitudinal axis if one of the wheels encounters a change in elevation in the terrain as the carrier and feeder is being moved in the field and permits the carrier and feeder to assume a low center of gravity.

28 Claims, 5 Drawing Sheets

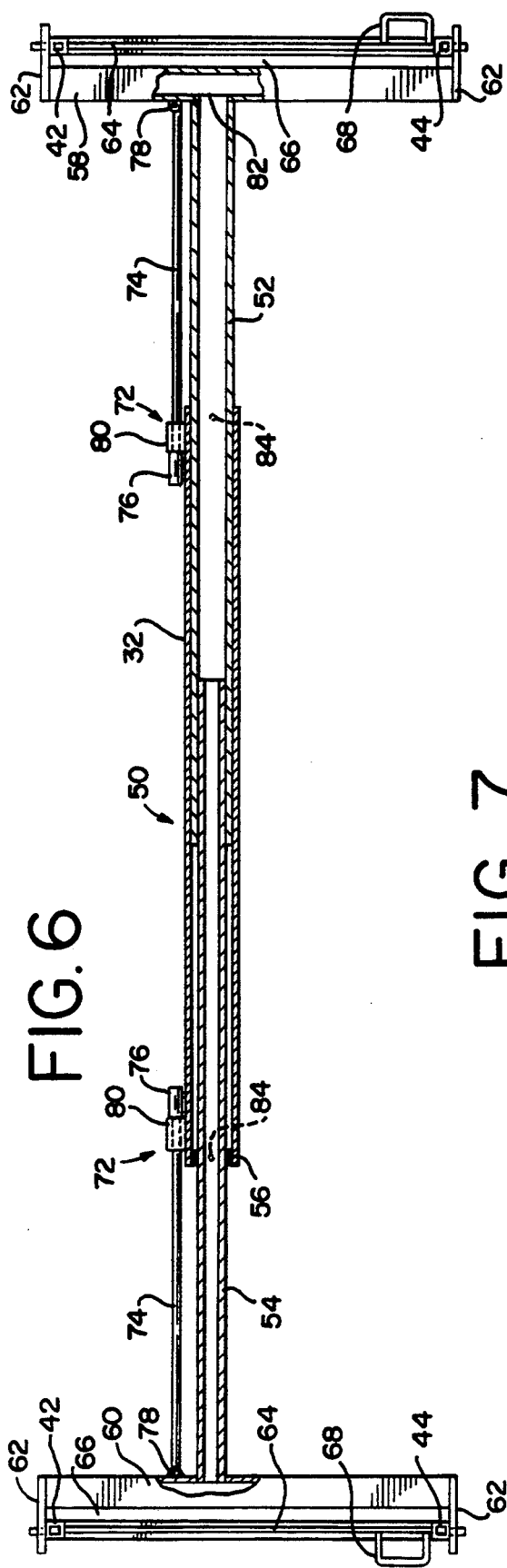
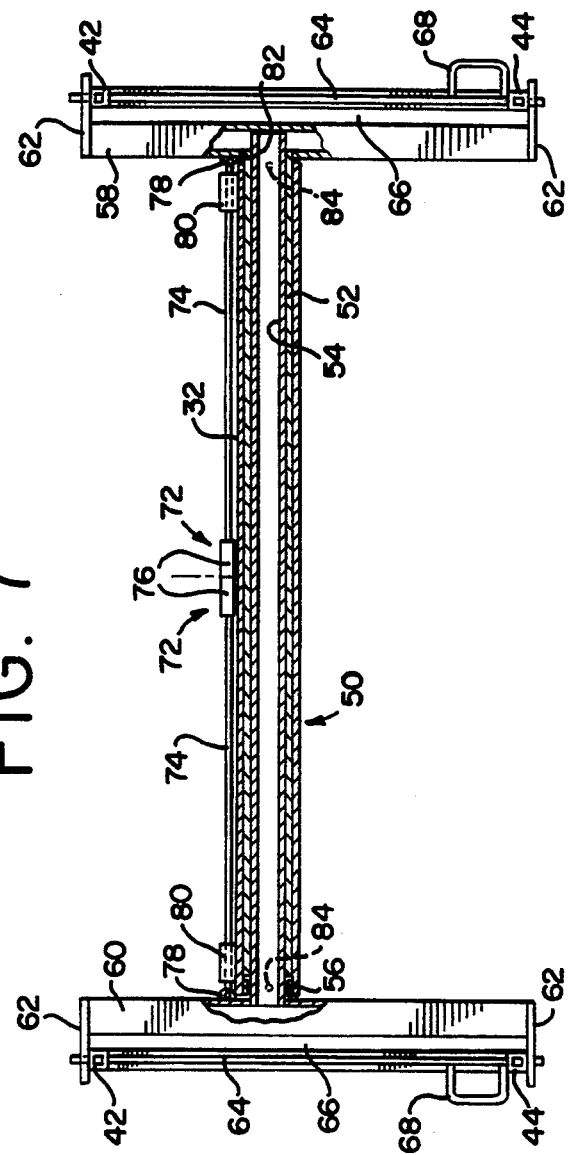
FIG. 6
FIG. 7

EXPANDABLE BALE CARRIER AND FEEDER

BACKGROUND AND SUMMARY OF THE INVENTION

The present invention is directed to an expandable livestock feeder and flexible chassis therefor, and more particularly, to an expandable hay bale carrier and feeder for transporting and presenting hay bales for feeding by livestock in the field.

A wide variety of livestock feeders have been employed in the past for the feeding of livestock in the field. In general, these feeders typically comprise a container of one form or another for containing one or more bales of hay. The container walls usually have openings therein to permit access by the livestock to feed on the hay within the container from outside of the container. In some instances the feeder is designed to be placed in a relatively permanent location in the field where it is initially filled and replenished at that location. In other instances the feeder is mounted on a wheeled chassis so that it may be transported from one location to another, such as for loading.

The non-transportable relatively permanently positioned feeders suffer a number of obvious disadvantages as a result of their generally non-transportable nature. Even the prior chassis mounted feeders which permit the transport of the feeder from one location to another have a number of disadvantages. One disadvantage is that many of the prior transportable feeders generally have a limited capacity. This is because the width of the feeder has generally been limited to a width which will permit livestock on each side of the feeder to be able to reach the hay in the center of the feeder. If the feeder width was increased in order to accommodate large bales in side by side relationship, the center of the feeder generally is not accessible by the livestock and a substantial amount of hay would remain unconsumed. Thus, the prior feeders, whether transportable or not, generally have not been capable of holding more than one large round bale of hay in side by side relationship. Multiple large hay bales could only be accommodated if the length of the feeder was substantially extended. However, extension of the feeder length presents its own difficulties, particularly where the feeder is chassis mounted for maneuvering and transport.

Another disadvantage experienced in the prior feeders, whether transportable or not, is the difficulty experienced in loading or unloading the feeders due to the fixed nature of the feeder side and end walls. Such feeders typically require loading with a front end loader and, once loaded, are difficult if not impossible to unload except by consumption of the contents by the livestock.

Still another disadvantage experienced by the prior feeders is their inability to compensate for the progressive consumption of the hay in the feeder. Specifically due to the fixed nature of the feeder walls, as the hay is consumed by the livestock, the walls remain stationary and act as a barrier to the livestock's access to the hay remaining in the feeder.

An attempt has been made to overcome the foregoing disadvantages by mounting the feeder side walls in a manner so that they are transversely movable either manually at various intervals of time or by the livestock as they feed to generally conform with the hay remaining in the feeder. These attempts do improve the capacity of the feeders. However, such manually adjusted feeders require repeated supervision and adjustment by the farmer and frequently result in time periods in which the live stock are deprived of hay awaiting adjustment of the side walls. In the prior transversely moveable side wall feeders in which the livestock adjust the feeder, the mechanism which mounts the side walls for transverse or lateral movement is cumbersome and generally blocks the ends of the feeder from access by the livestock, thereby preventing feeding simultaneously through all four walls of the feeder.

The feeder of the present invention overcomes all of the foregoing disadvantages. In the feeder of the present invention the volumetric capacity of the feeder may be readily varied so that the width of the feeder may be increased to a capacity large enough to accommodate at least two large round hay bales in side by side relationship. Yet, the width of the feeder may be readily decreased to accommodate the configuration of the hay in the feeder as it is being consumed and to permit access by the livestock to even the last remnants of hay in the center of the feeder, and the width may be readily adjusted to accommodate bales of different sizes. Moreover, the ends of the side walls of the preferred feeder of the present invention are capable of transverse movement independently of each other to permit the ends of the side walls to move transversely of the feeder in a manner to vary the shape of the feeder to closely conform with the shape of the hay remaining in the feeder even though consumption of the hay may have occurred at a more rapid rate at one end of the feeder than at the other. Another advantage of the preferred feeder of the present invention is that access to the hay in the feeder by the livestock is possible not only through the feeder side walls, but also through the end walls notwithstanding the fact that the end walls include the mechanism which mounts the side walls for independent transverse movement.

Another advantage of the present invention is that the side walls of the feeder may be opened to permit ready access to the feeder for loading or unloading of the hay bales and may be selectively opened at either end of the feeder.

Still another advantage of the present invention is that the volume of the feeder is automatically adjusted by the live stock as the livestock consumes the hay in the feeder.

Still another advantage of the preferred carrier and feeder of the present invention is that the feeder is readily capable of transport from one location to another either with or without bales therein. The preferred carrier and feeder of the present invention is capable of an extremely low profile and center of gravity. This not only presents its baled hay contents to the livestock at a low and readily accessible elevation to permit easy access to the contents and complete consumption thereof, but also substantially reduces any tendency of the loaded feeder to tip during transport, particularly in the field in which the terrain may be uneven. One of the features of the present invention by which this is made possible is by the uniquely constructed chassis of the present invention which permits the chassis to torsionally flex during transport through the field to permit it to accommodate any ruts or other uneven terrain which it may encounter.

In one principal aspect of the present invention, a hay bale feeder for livestock includes a bed for supporting at least one hay bale thereon and a pair of spaced end walls adjacent opposite ends of the bed and extending transversely of the bed and upwardly therefrom to retain the hay of said bale on the bed. A pair of spaced side walls extend longitudinally of the bed and upwardly therefrom to also retain the hay on the bed, the side walls having a length substantially equal to the spacing between the end walls. Mounting means mounts the side walls for movement transversely of the bed between a first position transversely spaced from the end walls and a second position adjacent the end walls. The mounting means also permits the movement between the first and second positions of the side walls by the livestock as they feed so that the side walls remain closely adjacent the hay as the hay is consumed by the livestock. The bed, end walls and side walls define a container of varying volume for the hay and the side walls and end walls have openings therein to permit access to the hay in the container for feeding of the livestock from the outside of the container and simultaneously through the side walls and end walls.

In another principal aspect of the present invention, the mounting means permits movement between the first and second positions of one end of a given side wall independent of the other end of the given side wall.

In another principal aspect of the present invention, the mounting means includes a first tubular member on each of the end walls extending transversely of the bed, and second elongate tubular members mounted to and adjacent each end of the side walls and slidably extending into the first tubular member to permit movement of the side walls between the first and second positions.

In still another principal aspect of the present invention, the second elongate tubular members are telescopically received in the first tubular member.

In still another principal aspect of the present invention, the second elongate tubular members of one side wall are telescopically received in the second elongate tubular members of the other side wall.

In still another principal aspect of the present invention, the mounting means includes means to permit at least one end of the side walls to move longitudinally of the bed as the side walls move between the first and second positions.

In still another principal aspect of the present invention, the last mentioned means includes first and second substantially vertical members which are moveable transversely toward and away from the bed, the vertical members being spaced from each other by a distance sufficient to slidably receive one end of the side walls therebetween.

In still another principal aspect of the present invention, the last mentioned means also includes a hinge for mounting the end of the end wall opposite the slidable end for rotation about a substantially vertical axis.

In still another principal aspect of the present invention, the mounting means includes means which permits both ends of the side walls to selectively and alternatively slidably move longitudinally of the bed or to rotate about a substantially vertical axis.

In still another principal aspect of the present invention, means is included to permit the side walls to be opened for loading or unloading of the hay bale into or out of the container.

In still another principal aspect of the present invention, the volume of the container is sufficient to accommodate a plurality of round hay bales supported on the bed in transverse side by side relation to each other when the side walls are in the first position.

In still another principal aspect of the present invention, the bed may be mounted on a wheeled vehicle chassis, whereby the container with or without the hay bales may be moved for transport from one location to another.

In still another principal aspect of the present invention, the chassis comprises a pair of beams spaced from each other and extending substantially transversely to the direction of movement of the chassis. Wheels are mounted adjacent the ends of the transversely extending beams to rollably support the chassis for such movement, and a pair of longitudinally extending beams spaced from each other extend between the transversely extending beams and substantially parallel to the direction of movement. One of the longitudinally extending beams is substantially rigidly fixed adjacent each of its ends to each of the transversely extending beams. The other of the longitudinally extending beams has at least one of its ends spaced from but supported upon one of the transversely extending beams for movement relative thereto, whereby when at least one of the wheels encounters a change of elevation of terrain relative to the other of the wheels during movement of the chassis, the chassis twists about an axis which is substantially parallel to the direction of movement.

In still another principal aspect of the present invention, both ends of the other of the longitudinally extending beams are spaced from but supported upon the transversely extending beams for movement relative thereto.

In still another principal aspect of the present invention, pin means adjacent the ends of the other longitudinally extending beam which loosely pin the ends to the transversely extending beams.

In still another principal aspect of the present invention, the longitudinally extending beams include a longitudinally extending opening therein which extends over a substantial portion of the length of the beams.

In still another principal aspect of the present invention, the opening is a slit in the bottoms of the beams.

In still another principal aspect of the present invention, the twisting of the chassis permits the wheels to remain at a substantially constant distance beneath the bed when any one of the wheels encounters a change in elevation in terrain.

These and other objects, features and advantages of the present invention will be more clearly understood upon consideration of the detailed description of the preferred embodiment of the invention which will be described to follow.

BRIEF DESCRIPTION OF THE DRAWINGS

In the course of this description, reference will frequently be made to the attached drawings in which:

FIG. 6 is a partially cross-sectioned, front elevation view of the mounting assembly for permitting transverse movement of the carrier and feeder side walls in their fully extended maximum width position, and as viewed substantially along line 6—6 of FIG. 2;

FIG. 7 is a partially cross-sectioned front elevation view of the mounting assembly substantially as shown in FIG. 6, but with the side walls in their fully contracted minimum width position;

DESCRIPTION OF THE PREFERRED EMBODIMENT

Figure 1:
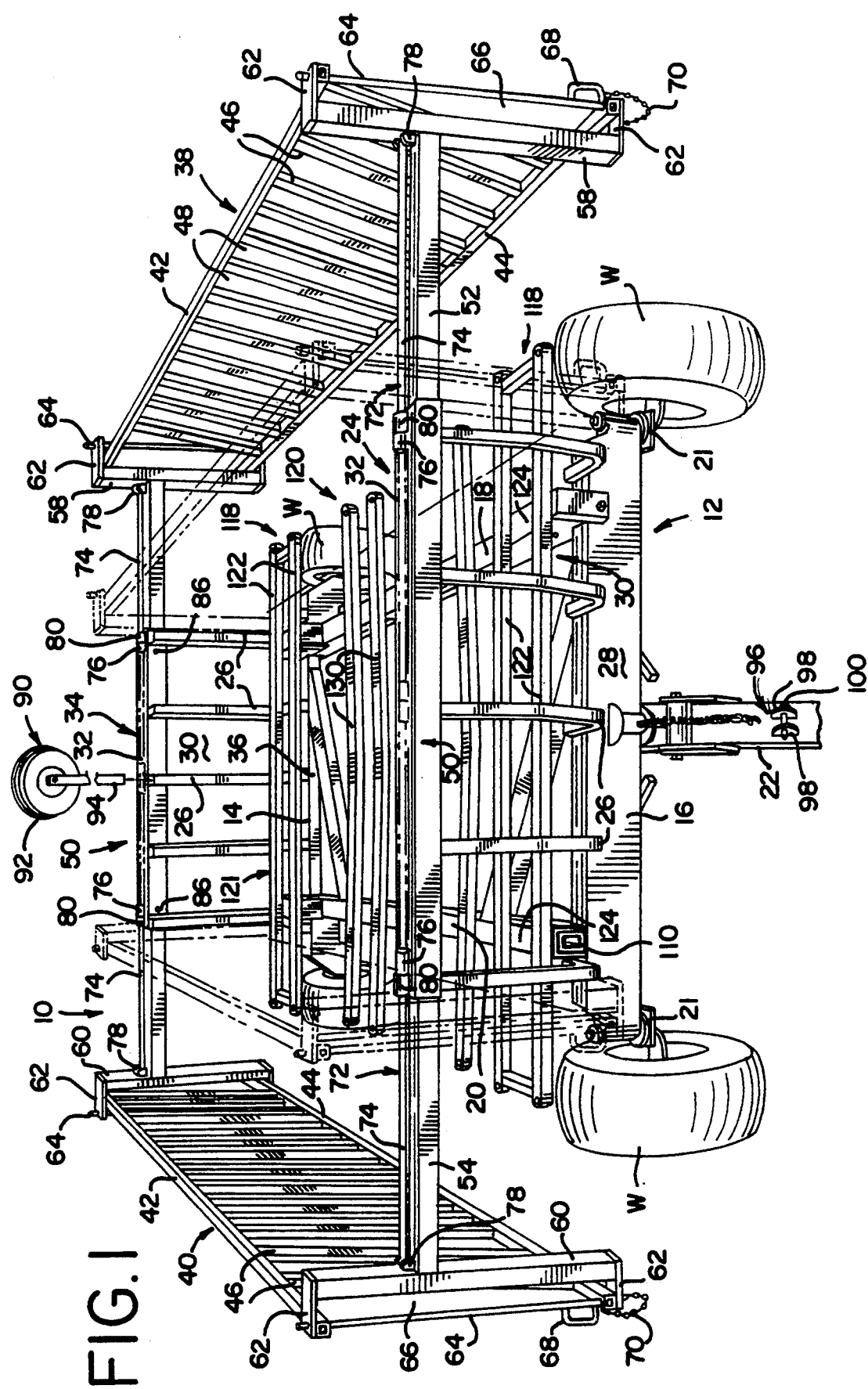
FIG. 1 is a front perspective view of a preferred embodiment of expandable bale carrier and feeder constructed in accordance with the principles of the present invention.
Figure 8:
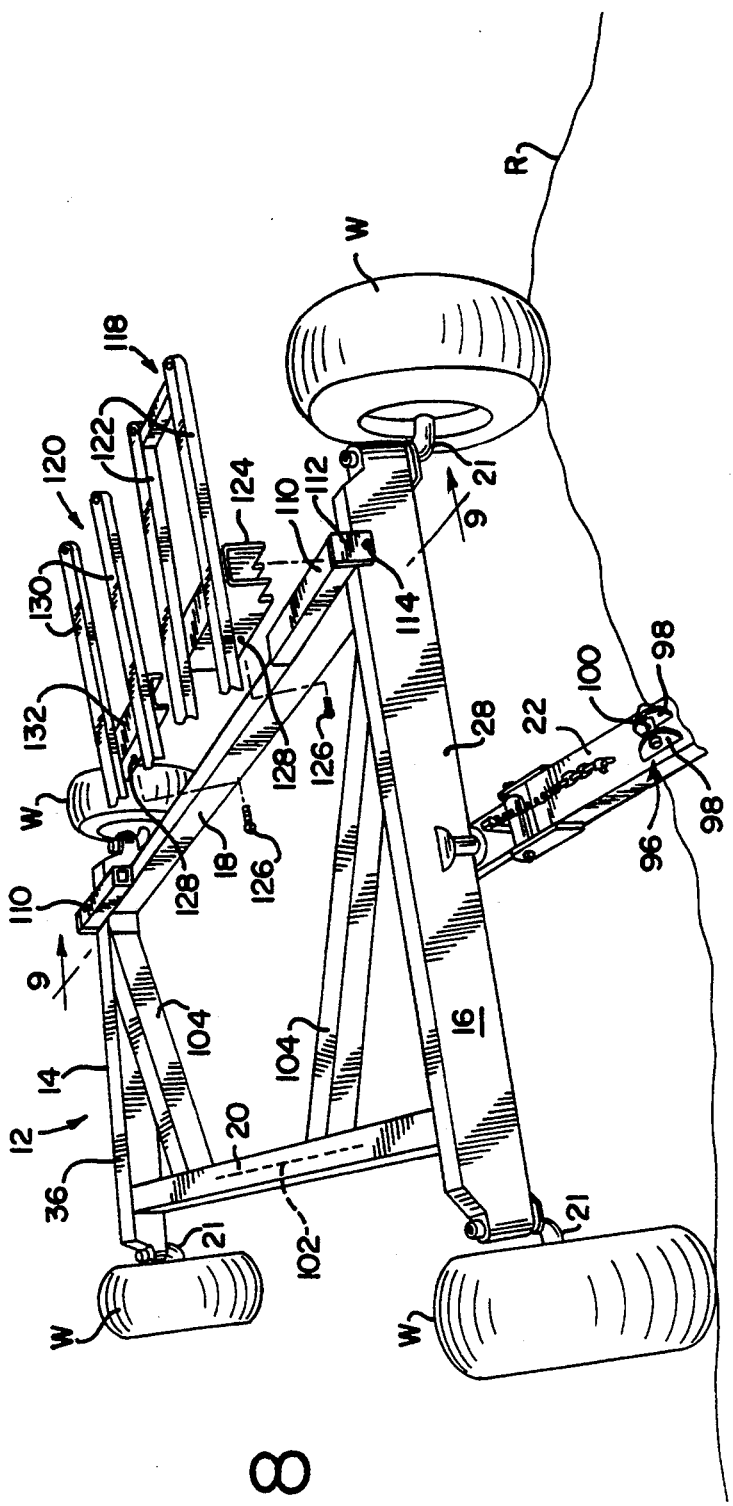
FIG. 8 is a front, partially exploded perspective view of a preferred embodiment of chassis of the bale carrier and feeder constructed in accordance with the principles of the present invention and demonstrating the ability of the chassis to independently and freely flex to accommodate uneven terrain.

A preferred embodiment of expandable bale carrier and feeder 10 constructed in accordance with the principles of the present invention is shown generally in FIG. 1. The carrier and feeder 10 comprises a vehicle chassis 12 having a rear axle assembly 14, front axle assembly 16 and a pair of longitudinally extending beams 18 and 20 extending between the front and rear axle assemblies. Both the front and rear axle assemblies 14 and 16 also include suitable mounts 21 at their ends, as best seen in FIGS. 1 and 8, for mounting wheels W for rotatably supporting the chassis 12 for transport. The front axle assembly 16 also includes a conventional tongue 22 for hitching the chassis to a prime mover, such as a tractor (not shown), to movably transport the carrier and feeder between different locations.

Figure 2:
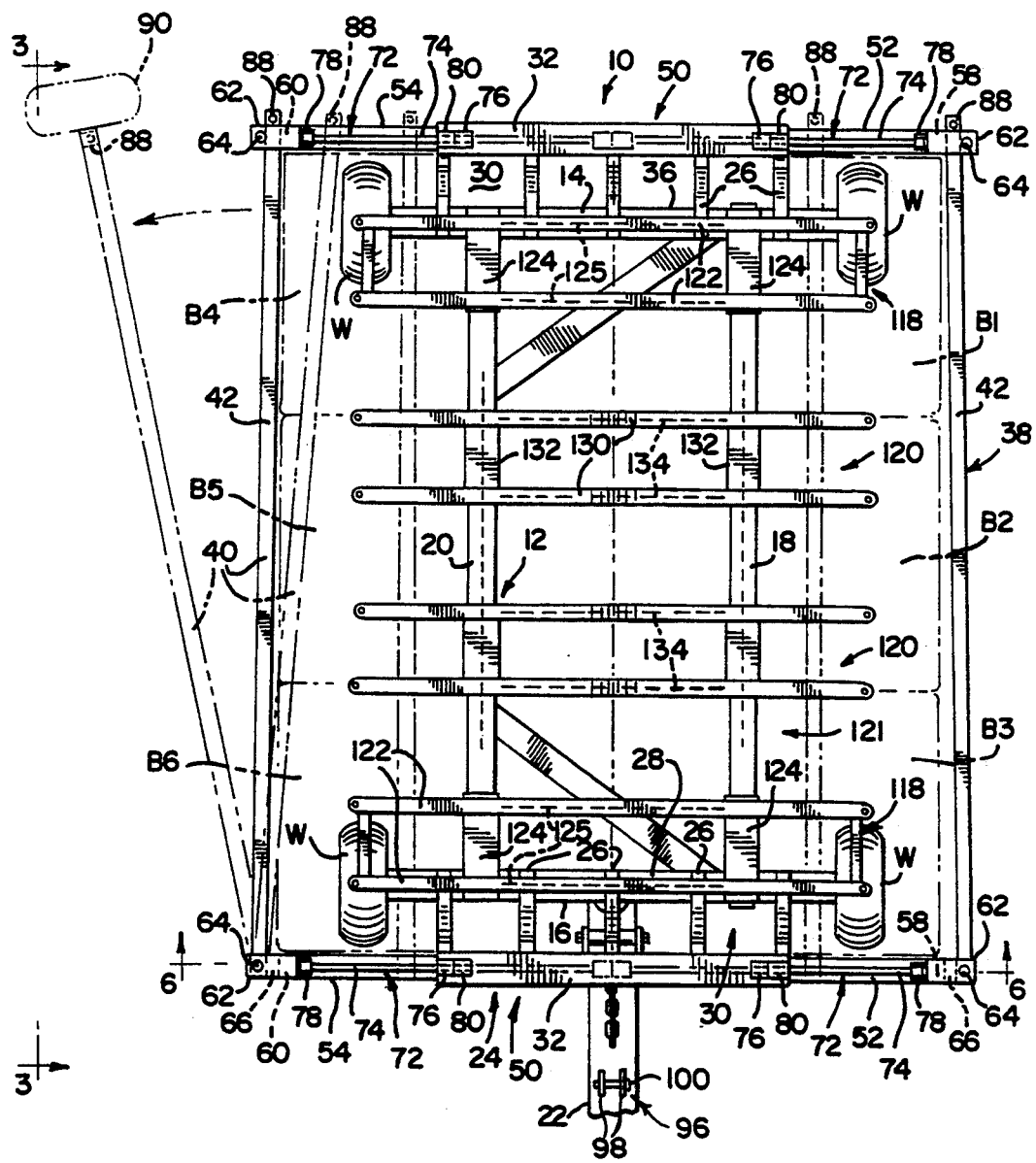
FIG. 2 is a plan view of the bale carrier and feeder substantially as shown in FIG. 1.

A front end wall 24 preferably comprises a plurality of forwardly extending, and upwardly bent angled bars or tubes 26 which are spaced from each other, as seen in FIGS. 1 and 2. The lower ends of the bars or tubes 26 are stationarily fixed to the transversely extending beam 28 of the front axle assembly 16. The respective bars 26 are transversely spaced from each other by a distance sufficient to define openings 30 therebetween which are large enough to permit the livestock to extend their heads from outside of the feeder through the respective openings 30 and into the feeder for feeding on the hay within the feeder. The upper ends of the bars or tubes 26 are stationarily affixed to the inside of a transversely extending tubular member 32, as by welding. The tubular member 32 and its particular function in side wall movement will be described in further detail later.

A rear end wall 34 is also provided at the rear of the carrier and feeder 10 and is attached to the transversely extending beam 36 of the rear axle assembly 14. The rear end wall 34 is of substantially identical construction to the front end wall 24 and, thus, like elements have been denoted with like reference numerals. The front and rear end walls 24 and 34 retain the hay bales B1-B6, as shown in dot and dash in FIGS. 2-3, on the carrier and feeder 10 both during feeding by the livestock, as well as during transport, yet the openings 30 in the end walls permit ready access to the hay bales therein by the livestock for feeding.

Figure 3:
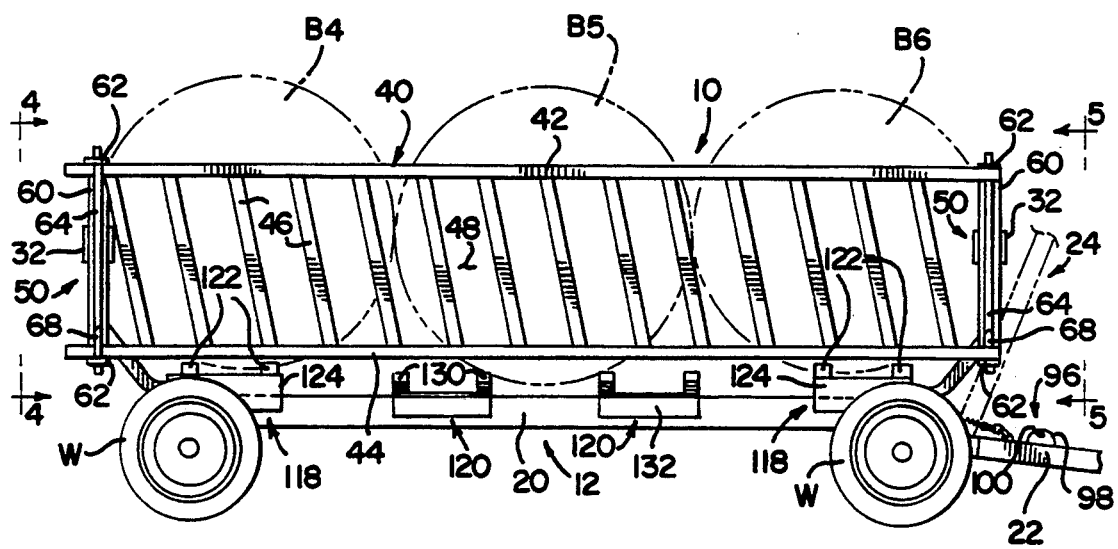
FIG. 3 is a side elevation view of the carrier and feeder as viewed substantially along line 3—3 of FIG. 2.

The preferred bale carrier and feeder of the present invention also includes a pair of laterally spaced side walls 38 and 40 which extend longitudinally of the carrier and feeder 10 as best seen in FIGS. 1-3, between the front end wall 24 and rear end wall 34. Each of the side walls 38 and 40 include a longitudinally extending upper tubular member 42 and lower tubular member 44. A plurality of spaced, generally upwardly extending angled tubes or bars 46 are rigidly affixed, as by welding, to the upper and lower tubes or bars 42 and 44, as best seen in FIGS. 1 and 3. The tubes or bars 46 of the side wall 38 preferably slant upward toward the front of the feeder, and the tubes or bars 46 of sidewall 40 preferably slant upward toward the rear of the feeder. The reason for such preferred direction of angular slant is that cattle generally tend to move their heads in a leftward direction when feeding. Thus, once a livestock has inserted its head in a opening 48 between adjacent tubes or bars, it will tend to remain in that position while feeding, rather than take a bite and withdraw its head. The latter would tend to deplete the hay within the feeder faster and waste the hay because the stock would tend to pull the hay from the feeder and lose it to the ground before it can be consumed.

A particularly unique feature of the present invention is the mounting assembly 50 by which the side walls 38 and 40 are mounted to the end walls 24 and 34. The construction of the mounting assembly at the rear of the feeder is substantially identical to the assembly at the front. Therefore, only the front mounting assembly 50 will be described in detail.

The preferred mounting assembly 50 includes a pair of transversely extending tubular members 52 and 54. One of the ends of the tubular member 52 extends into the tubular member 32 and the tubular member 52 extends outwardly therefrom toward an end of the side wall 38. One of the ends of the tubular member 54 also extends into the tubular member 32 and the tubular member 54 extends outwardly therefrom toward an end of the other side wall 40. The tubular member 54, as best seen in FIGS. 6 and 7, also slidingly extends into the tubular member 52 inside of the tubular member 32. Thus, the tubular members 52 and 54 are both telescopically slidable in the tubular member 32, and tubular member 54 is further telescopically slidable in tubular member 52.

It is also preferred that a short piece of approximately one inch of the same tubular material of which tubular member 52 is formed be rigidly fixed, as by welding, at the left inside end of the tubular member 32, as best seen in FIG. 6. This short piece forms a short guide sleeve 56 upon which the tubular member 54 may slide. It will be understood that the relationship of the tubular members 52 and 54 may be reversed if desired, i.e. the member 52 may be telescopically slidable in the member 54.

By way of example, the tubular member 32 may be formed of a box channel which is 4×4 inches square in cross section, tubular member 52 may be formed of a channel which is 3½×3½ inches square in cross-section, and tubular member 54 may be formed of a channel which is 3×3 inches square in cross section. Each of the tubular members 32, 52 and 54 are preferably on the order of about 5 feet long so that the minimum overall width of the carrier and feeder is about five feet, and when fully extended, the maximum overall width is about eleven feet. These maximum and minimum widths permit the carrier and feeder to accommodate large round bales of approximately 2,000 pounds each and which are approximately six feet in diameter and 5½ feet long, with two bales in side by side relationship.

The foregoing dimensions are given by way of example only and it will be appreciated that other cross sectional dimensions and shapes are contemplated by the present invention, so long as the dimensions and shapes are compatible with each other to permit the sliding telescopic movement of the tubular members relative to each other. For example, the tubular members 32, 52 and 54 may be circular in cross section without departing from the principles of the invention.

Figure 4:
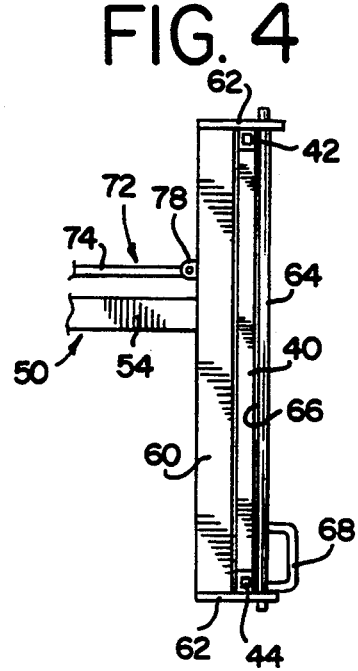
FIG. 4 is a broken rear elevation view of a portion of the mounting assembly for a side wall of the carrier and feeder, as viewed substantially along line 4—4 of FIG. 3, and showing the side wall mounted for sliding.

Vertically extending members 58 and 60, as best seen in FIGS. 1, 6 and 7, are rigidly affixed to the outer end of each of the tubular members 52 and 54. The vertical members 58 and 60 are preferably of a length which is approximately equal to the height of the side walls 38 and 40. Outwardly extending flanges 62 are rigidly affixed to the top and bottom of the vertical members 58 and 60, as by welding. The flanges 62 have an opening therethrough (not shown) adjacent their outer ends to receive a vertical rod 64 in spaced relation to the respective vertical members 58 and 60. The space 66 between the vertical members 58 and 60 and the vertical rod 64 is sufficient to slidably accommodate the adjacent ends of the side walls 38, 40, as shown in FIGS. 2 and 4, and for a reason to be described to follow.

Each of the rods 64 preferably includes a handle 68 adjacent their bottom to permit insertion and removal of each of the rods into and from the openings in the flanges 62, and to prevent the rods from falling through the openings in the bottom flanges. A suitable chain 70, as shown in FIG. 1, may also be provided to prevent loss of the rods 64.

Returning to the tubular telescopic portion of the mounting assembly 50, a limit stop assembly 72 is preferably provided to limit the movement of the side walls 38 and 40 to their maximum outer width limit, as shown in dot and dash in FIG. 2. The limit stop assembly 72 preferably comprises an elongate transversely extending rod 74 which carries an enlargement 76 at its innermost end, such as a short piece of pipe which is slipped over the end of the rod 74 and welded thereto. The rod 74 is attached at its other end by way of a pivotal fastener 78 to the inner face of the vertical members 58, 60. A piece of pipe similar to the enlargements 76 is welded adjacent the end of the tubular member 32 to form an abutment 80 which the enlargement 76 will come to rest against to limit the outward movement of the side walls 38 and 40, as best seen in FIGS. 1, 2 and 6.

In order to minimize and maximize the extent of the telescoping movement of the tubular members 32, 52 and 54 relative to each other, at least one of the sliding tubular members 52 or 54 is preferably dimensioned to actually slide into one of the vertical members 58, 60 when the side walls have been moved to their minimum width position and closest to each other. By way of example and as shown in FIGS. 6 and 7, the tubular member 54 is slightly longer than the tubular member 52 and it enters an opening 82 cut in the face of the vertical member 58.

It is also preferred to be able to lock the tubular members 52 and 54 to prevent the movement of the side walls 38 and 40 due to road vibration and the like, particularly during transport of the bale carrier and feeder, and particularly when it is empty. This can simply be accomplished by way of a threaded opening 84 through each end of the tubular members 32, as best seen in FIGS. 6 and 7, and a threaded bolt 86 may be threaded into the openings, as best seen in FIG. 1, and tightened to prevent movement of the slidable tubular members relative to each other.

As previously mentioned, the space 66 between the vertical members 58, 60 and the vertical rod 64 is sufficient to slidably receive one end of the slide wall 38, 40. This condition is shown in FIG. 4 in which it will be seen that the vertical rod 64 acts to restrain the side wall 40 from falling outwardly from between the flanges 62 when the rod is in place in the openings in the upper and lower flanges 62.

Figure 5:
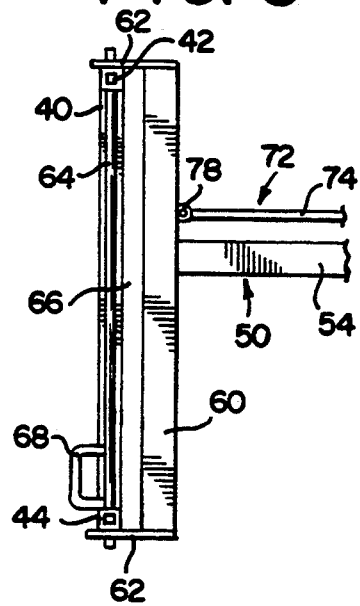
FIG. 5 is a broken front elevation view of a portion of the mounting assembly for a side wall of the carrier and feeder, as viewed substantially along line 5—5 of FIG. 3, and showing the side wall hingedly mounted.

The vertical rod 64 may also selectively and alternatively function in another mode to act as a hinge pin for hinging an end of the side walls 38, 40. This hinged condition is best seen in FIG. 5. Each end of upper and lower longitudinal tubes 42 and 44 of the side walls 38 and 40 have an opening 88 therethrough, as best seen in FIG. 2, to accommodate the diameter of the vertical rods 64. Thereby, when the openings 88 are positioned so that they coincide with the openings in the flanges 62 and the rod 64 is inserted through the openings, the resulting assembly will function as a hinge in order to permit the rotation of the hinged end of the side walls about the vertical axis defined by the vertical rod 64.

As shown in the drawings, the ends of the side walls 38 and 40 adjacent the rear of the carrier and feeder 10 are shown rigged in the slide condition in FIGS. 1–4, and the ends of the side walls 38 and 40 adjacent the front of the carrier and feeder 10 are shown rigged in the hinge condition in FIGS. 1–3 and 5–7. It will be appreciated that this hinged/slide relationship can be readily reversed.

The ability to selectively and alternately rig one end of each of the side walls 38 and 40 in a hinged condition and the other end in a slide condition is important among other things, to permit each of the ends of the side walls 38 and 40 to move independently and inwardly as the livestock feed and by the force which the livestock exert as they bear against the side walls while feeding. Therefore, the side walls will generally remain in closely following continuing contact with their adjacent bales as the bales are consumed. Thus, if one of the bales adjacent an end of the carrier and feeder 10 is consumed at a faster rate than its corresponding bale at the other end, the livestock will automatically cause the end of the side wall to move inwardly at a faster rate at the end at which consumption has been greater and as seen in FIG. 2. In the absence of the ability of one end of the side walls to slide to assume a non-perpendicular relationship to the front or rear end walls 24 or 34, they would have to move in unison and the livestock might not be able to continue to reach the hay at the high consumption end until the degree of consumption catches up at the other end. Moreover, the hinged/sliding mounts of each of the side walls permit the carrier and feeder 10 to be readily loaded and unloaded as will be described in detail later.

As shown in FIGS. 1 and 2, a small wheeled support 90 may also be provided for supporting the free end of a side wall 38 or 40 when it is swung into an opened position for loading and unloading the carrier and feeder 10. The wheeled support 90 preferably includes a small wheel 92 which is mounted for rotation on a support post 94. The end of the support post 94 opposite the wheel is preferably dimensioned to fit into an upper end of one of the end wall vertical tubes 26 for storage during transport and field feeding as shown in FIG. 1. When it is desired to load or unload the bale carrier and feeder 10, the wheeled support 90 is removed from its stored condition and inserted into the opening 88 in the lower tube 44 on the non-hinged opened end of the side wall 38 or 40 which is swung open, as depicted in dot and dash in FIG. 2.

A tongue latching assembly 96 is also preferably provided on the top of and intermediate the length of the towing tongue 22 to permit the tongue to be latched in a vertical position and out of the way of the feeding livestock when the feeder and carrier has been positioned in the field for feeding. As shown in FIGS. 1-3 and 8, the tongue latching assembly 96 preferably comprises a pair of upstanding flanges 98 which are positioned on the top of the tongue 22, and which are spaced from each other by a sufficient distance to receive one of the vertical tubes 26 of the front end walls 24 therebetween. A removable pin 100 extends between the flanges 98. Thus, when the carrier and feeder 10 has been positioned in the field for feeding, the tongue 22 may be elevated until the flanges 98 straddle one of the vertical tubes 26 of the front end wall 24, and the pin 100 reinserted to lock the tongue 22 in a substantially vertical position and out of the way of the livestock, as shown in dot and dash in FIG. 3.

An important feature of the present invention also resides in the construction of the chassis 12 which permits the chassis to readily transit fields of relatively uneven terrain, and yet freely flex or twist to conform with the terrain without tipping. Moreover, the ability of the chassis 12 to flex as will be described also makes possible the substantial lowering of the center of gravity of the chassis. This chassis flexing or twisting ability together with its ability to permit the lowering of the center of gravity of the carrier and feeder 10 is significant when it is considered that the preferred bale carrier and feeder of the invention is capable of transporting up to six round hay bales which may each weight upwards of 2,000 pounds each and with pairs of such bales in side by side relationship and substantially overhanging the sides of the chassis. Absent the ability of the chassis to flex or and/or the substantially low center of gravity, there would be a tendency of the loaded bale carrier and feeder to tip over during transport to and into the field.

This flexing or twisting of the chassis 12 is achieved by the longitudinal beams 18 and 20 of the present invention which are uniquely configured and mounted with respect to the transverse axle beams 28 and 36 of the rear and front axle assemblies 14 and 16.

Figure 9:
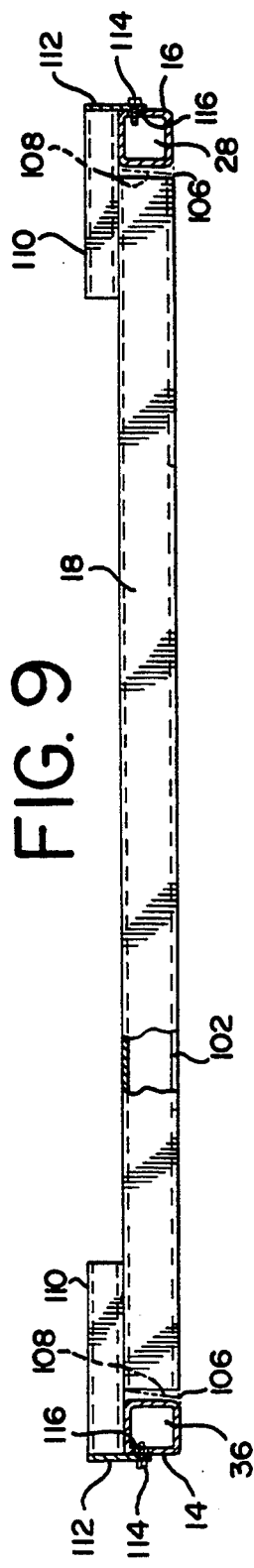
FIG. 9 is a cross-sectioned, partially broken side elevation view of one of the longitudinally extending chassis beams, as viewed substantially along line 9—9 of FIG. 8.

In the first instance each of the longitudinal chassis beams 18 and 20 is preferably of rectangular cross-section, for example about 4 inches wide by 6 inches deep, and is box shaped. Although box beams are shown, it will be appreciated that the longitudinal beams 18 and 20 may have a different cross-section, e.g. circular or oval in cross-section. The underside of each of the longitudinal beams 18 and 20 preferably includes a slit 102, as shown in FIGS. 8 and 9, intermediate the length of the beams. This slit 102 preferably extends over a portion of the length of each of the beams which is a little greater then half the length of each beam. For example, a slit 102 of approximately 9 feet in length has been found to be satisfactory for a total beam length of about 17 feet. The slit 102 preferably does not extend the full length of its beam to reduce the possibility that the beam dimensions may spread as they torque. Yet the slits 102 facilitate the twisting and flexing of the longitudinal beams 18 and 20 and the chassis.

Longitudinal beam 20 is preferably rigidly affixed between the transverse axle beams 28 and 36, as shown in FIG. 8., such as by welding. In addition, diagonal bracing beams 104 are also shown which are rigidly affixed, such as by welding, between the inside of the front axle beam 28 and rear axle beam 38, respectively, and intermediate the length of the longitudinal beam 20 as shown in FIG. 8. The diagonal bracing beams 104 assure that the chassis 12 is maintained in a substantially rectangular configuration at all times.

The longitudinal beam 18 is also preferably a box beam of substantially rectangular cross-section, and also includes a longitudinally extending slot 102 in its bottom face, as shown in FIG. 9, which extends over a length which preferably is somewhat greater than half the length of beam 18, but short of its overall length for the reasons previously stated. Unlike the longitudinal beam 20, longitudinal beam 18, as shown, is not rigidly affixed either to the front axle beam 28 or the rear axle beam 36. Instead, in the preferred chassis embodiment its length is slightly shorter than the distance between the transversely extending axle beams by on the order of ½ inch or so. This results in a space 106 between at least one and preferably both of its ends, as shown in FIG. 9. This space 106 permits the front axle beam 28 and/or rear axle beam 36 and the longitudinal beam 18 to flex independently of each other as represented by the dot and dash lines for the beam ends 108, as shown in FIG. 9. This permits the entire chassis 12 to flex and twist generally about an axis which is parallel to the direction of movement of the carrier and feeder 10 when, for example, one of the wheels W, as shown in FIG. 8, encounters a rise R in the terrain.

In the preferred embodiment of chassis of the present invention, the longitudinal beam 18 is supported at its ends upon the front axle beam 28 and rear axle beam 36 by a short section of rectangular box beam stub 110 which overlies the top of the longitudinal beam 18 and is rigidly affixed thereto, as by welding. As can be seen in FIGS. 8 and 9, the outward ends of the beam stubs 110 extend into overlying relationship and are supported upon the top of the front axle beam 28 and rear axle beam 36. The beam stubs 110 together with the longitudinal beam 18 are coupled to the front and rear axle beams by a plate 112 which is welded over the open ends of the beam stubs 110 and extends vertically downwardly over the front and rear faces, respectively, of the front axle beam 28 and rear axle beam 36, as shown in FIG. 9. A threaded opening is provided adjacent the lower end of each plate 112 to threadedly receive a threaded bolt or pin 114 therein. The inner end of the threaded bolt or pin 114 extends loosely into a somewhat enlarged opening 116 in the front axle beam 28 and rear axle beam 36. Thus, the longitudinal beam 18 is supported for relatively unrestrained movement relative to the front and rear axle beams, but is held in its supported relationship thereon by the pin assembly just described.

From the foregoing it will be appreciated that the ability of the chassis 12 to flex or twist eliminates the need to provide conventional rocking bolsters or oscillating axle assemblies to mount the wheels W to the chassis to compensate for or accommodate for uneven terrain. Such conventional assemblies would permit the wheels W to move up and down relative to the bottom of the bales which are being transported when one or more of the wheels encounters a rise or depression in the terrain. If such relative movement existed, it would be necessary to raise the bottom of the bales to accommodate this wheel motion in order to prevent the wheels from striking the bale bottoms or supports for the bales. This would result in an attendant undesirable raising of the center of gravity of the load. However, the ability of the chassis 12 of the present invention to itself flex or twist will insure that the relative distance between the tops of the wheels W and the bale bottoms will remain substantially constant at all times no matter what irregularities in terrain are encountered. For example, this distance may be on the order of a mere two inches. Thus, the center of gravity of the load may be advantageously lowered to the maximum extent possible. The center of gravity may even be lowered further by utilizing wheels W of minimum diameter, e.g. on the order of 12 inches.

As shown in FIGS. 1—3 and 8, a pair of end bale support cradle assemblies 118 and one or more intermediate bale support cradle assemblies 120 are preferably provided on the chassis 12 to form a bed 121 on the carrier and feeder 10 to support the bales thereon.

Each of the end cradle assemblies 118 preferably comprises a pair of spaced support rails 122 which extend transversely of the chassis 12. The support rails 122 are affixed adjacent each of their ends to the top of a downwardly extending U-shaped channel 124, as by welding. As shown in FIG. 2, the support rails 122 also preferably include an opening or slit 125 in their bottoms which extends longitudinally of the rails between the U-shaped channels 124 to accommodate the flexing of the chassis 12 when one of the wheels encounters a change in elevation in the terrain. The downwardly extending legs of the U-shaped channels 124 are of sufficient length to straddle both the height of each of the box beam stubs 110 and at least a portion of the height of the longitudinal beams 18 or 20, as best seen in FIG. 3. A set screw 126 is provided which is received in an opening 128 on the inner leg of each of the U-shaped channels 124, as best seen in FIG. 8, to permit attachment, longitudinal adjustment and removal of the end cradle assemblies 118.

In order to present an identical support configuration to receive the U-shaped channels 124 at the stationary fixed longitudinal beam 20, beam stubs 110 are also provided at the ends of that beam as at the ends of the beam 18, although those beam stubs are not necessary to support the beam 20. One such beam stub 110 is shown at the end of longitudinal beam 20 in FIG. 1.

The intermediate cradle assemblies 120 also preferably comprise a pair of spaced support rails 130 which extend transversely across the width of the chassis 12. As in the end cradle assemblies 118, support rails 130 are also rigidly affixed, as by welding, to the upper side of a pair of spaced U-shaped channels 132 which, in turn, straddle the longitudinal beams 18 or 20 at a point intermediate the length of the longitudinal beams. As shown in FIG. 2, the bottoms of the support rails 130 also preferably include an opening or slit 134 over their lengths between the U-shaped channels 132 to facilitate twisting as previously described with respect to slits 125. The legs of the U-shaped channels 132 are somewhat shorter in height than those of the U-shaped channels 124 because they are supported directly upon the upper surface of the longitudinal beams 18 and 20. The U-shaped channels 132 also preferably include a set screw 126 and opening 128 on the inner side of the channels, as best seen in FIG. 8, to permit their attachment to, removal from and longitudinal slidable adjustment along the longitudinal beams 18 and 20. Thus, both the end bale support cradle assemblies 118 and the intermediate bale support cradle assemblies 120 may be slidably adjusted and/or added or removed as needed to support hay bales of differing diameter or of greater or fewer numbers.

It is also preferred that the support rails 130 of the intermediate cradle assemblies 120 be slightly indented in their centers, as best seen in FIG. 1, so that their ends may be elevated somewhat to be more in line with the elevation of the support rails 122 of the end cradle assemblies 118. This results in a slight elevation of the outside of the center bales B2 and B5 so that their elevation visually conforms with the end bales B1, B3, B4 and B6.

The end cradle assemblies 118 and intermediate cradle assemblies 120 facilitate the support of the bales at their lowest possible center of gravity. As previously mentioned, the distance between the underside of the support rails 122 of the end cradle assemblies 118 and the top of the wheels W need only be on the order of two inches because that distance remains relatively constant when uneven terrain is encountered during transport.

Although it is believed from the foregoing description of the preferred embodiment of the invention that the operation of the bale carrier and feeder will be clear, a brief description thereof follows.

DESCRIPTION OF OPERATION

In order to load the empty bale carrier and feeder with the maximum load, the side walls 38 and 40 are moved to their maximum width outward position as shown in solid in FIGS. 1 and 2. This is accomplished by slidably moving the tubular members 52 and 54 out of the tubular member 32. As the tubular members 52 and 54 move outwardly, the rods 74 of the limit stop assemblies 72 will slide in the abutments 80 until the enlargements 76 at the end of the rods come to rest against the abutments 80 to prevent the tubular members 52 and 54 from being pulled entirely out of the tubular member 32. The positioning of the tubular members 32, 52 and 54 in this maximum width position is shown in detail in FIG. 6. In this position the maximum width is preferably about eleven feet which will permit the bale carrier and feeder 10 to accommodate a pair of large round hay bales which are about 5½ feet long in side by side relationship on the bed 121.

Also as previously mentioned, the vertical rods 64 which are associated with the vertical members 58 and 60 may alternatively function in one of two conditions. In one condition an end of the side walls 38, 40 may be slidably positioned in the space 66 between the vertical rod 64 and the vertical members 58, 60. In the other condition the vertical rod 64 may be positioned to function as a hinge pin when it is extended through the openings 88 in the ends of the upper and lower tubes 42 and 44 of the side walls 38 and 40. In preferred practice, one end of each side wall, for example the front end as shown in the drawings, will be mounted to function as a hinge, and the other end, for example the rear end of the side walls as shown in the drawings, will be mounted to function in the slide mode. It will be understood that these functions may be readily reversed, i.e. with the hinge at the rear and the slide at the front for either or both of the side walls.

To load the bale carrier and feeder of the invention, all that need be done is to lift the vertical rod 64 manually with its handle 68 and remove it from the openings through the flanges 62 at the end of a side wall which has been rigged in the slide mode. Once the vertical rod is removed, that side wall, for example side wall 40 as shown in FIG. 2, may be swung outwardly about the hinged mounting at the other end, as shown in dot and dash in FIG. 2. This will open one side of the container to permit ready loading of that side with large round hay bales B4, B5 and B6, as shown in dot and dash in FIG. 2. Ease of loading is facilitated by the low center of gravity of the chassis 12. Once loading is complete on one side, the side wall 40 is swung to its closed position and the vertical rod 64 is reinserted in the openings in flanges 62 with the end of the side wall 40 slidably repositioned in the space 66 between the rod 64 and the vertical member 60 as shown in FIG. 4.

When the side wall 40 is swung to its open position as shown in dot and dash in FIG. 2, the wheeled support 90 may be removed from its stored position as shown in FIG. 1, tipped over and installed beneath the open end of the side wall to support it, as shown in dot and dash in FIG. 2.

This procedure is again repeated on the other side of the carrier and feeder to load the other side with the large round hay bales B1, B2 and B3. Once the other side is loaded, the carrier and feeder will be loaded to its maximum capacity with pairs of large round bales in transverse side by side relationship.

At this point the loaded carrier and feeder 10 may be transported to the field in which the livestock are to feed and left there for the feeding to take place. The livestock will be able to feed from all sides of the carrier and feeder container by inserting their heads through the openings 48 in the side walls 38 and 40 and through the openings 30 in the front end wall 24 and rear end wall 34. At this time the tongue 22 is also preferably raised to the vertical, as shown in dot and dash in FIG. 3, and held in that position by the latching assembly 96. This prevents the tongue 22 from being contaminated by the livestock during feeding and the livestock from tripping over the tongue.

During transport to the field, the chassis 12 of the low center of gravity carrier and feeder 10 is capable of substantial flexing and twisting generally about a longitudinal axis in the direction of movement in the event that the individual wheels W encounter terrain of differing elevation as previously described. This substantially reduces the possibility that the carrier and feeder will tip over during transport, particularly in view of the substantial load that it is transporting.

After placement in the field, the force of the livestock leaning against the side walls 38 and 40 as they feed and reach for more hay will cause the side walls to automatically move inwardly toward the ends of the end walls 24 and 34 as the hay is consumed. This is facilitated by the tubular member 54 telescopically and progressively sliding into the tubular member 52, and both tubular members telescopically and progressively sliding into the tubular member 32, as best seen in FIGS. 6 and 7. Moreover, each end of the side walls 38 and 40 is capable of such movement independently of the other end of the same side wall. This is due to the fact that one end of a given side wall is mounted to function as a hinge and rotate about a vertical axis defined by the vertical rod 64, while the other end is able to longitudinally slide between its vertical member 58, 60 and the vertical rod 64. This arrangement thereby compensates for the effective variations in the length of the side wall which will occur when the rate of consumption of the hay is greater at one end of the carrier and feeder than at the other end. This condition is shown in dot and dash in FIG. 2 in which side wall 40 is shown being moved inwardly at a greater rate at the rear of the container than at the front.

As feeding continues, the side walls 38 and 40 will finally both move to their inner minimum width position as shown in dot and dash in FIGS. 1 and 2. In this position the tubular members 52 and 54 have telescopically completely slid into each other, as shown in FIG. 7, and the end of tubular member 54 has moved into the opening 82 and is positioned within the vertical member 58. In this condition the width of the carrier and feeder is preferably on the order of about five feet which permits feeding to continue until all of the hay has been consumed. Such width permits the livestock to reach the center of the container from both sides.

Once all of the hay has been consumed, the side walls 38 and 40 may be locked in their minimum width position, the position shown in dot and dash in FIGS. 1 and 2, by the bolts 86 which are tightened in the holes 84 to keep the side walls from vibrating out of position during transport. The carrier and feeder now may be transported from the field back to a location for reloading. In the alternative, it may be reloaded directly in the field.

Although the carrier and feeder 10 has been described for use with round bales of hay, it will be appreciated that it may be used with equal facility with hay bales of other shapes, such as rectangular bales, and with unbaled hay.

It also will be understood that the preferred embodiment of the present invention which has been described is merely illustrative of the principles of the present invention. Numerous modifications may be made by those skilled in the art without departing from the true spirit and scope of the invention.

We claim:
1. A hay bale feeder for livestock comprising:
a bed for supporting hay thereon; p1 a pair of spaced end walls adjacent opposite ends of said bed and extending transversely of said bed and upwardly therefrom to retain the hay on said bed;
a pair of spaced side walls extending longitudinally of said bed and upwardly therefrom to also retain the hay on said bed, said side walls having a length substantially equal to the spacing between said end walls;
mounting means mounting said side walls for movement transversely of said bed between a first position transversely spaced from said end walls and a second position adjacent said end walls, said mounting means permitting the movement between said first and second positions of said side walls by the livestock as they feed so that the side walls remain closely adjacent the hay as the hay is consumed by the livestock, whereby said bed, end walls and said walls define a container of varying volume for the hay, said mounting means permitting movement between said first and second positions of one end of a given said side wall independent of the other end of the given side wall; and
said pair of side walls and said pair of end walls having openings therein to permit access to the hay in said container for feeding of the livestock from outside of said container simultaneously through said side walls and said end walls.

2. The feeder of claim 1, wherein said mounting means include:
- a first tubular member on each of said end walls and extending transversely of said bed; and
- second elongate tubular members mounted to and adjacent each end of said side walls and slidably extending into said first tubular member to permit movement of said side walls between said first and second positions.

3. The feeder of claim 2, wherein said mounting means including means which permits both ends of said side walls to selectively and alternatively slidably move longitudinally of said bed or to rotate about a substantially vertical axis.

4. A hay bale feeder for livestock comprising:
- a bed for supporting hay thereon;
- a pair of spaced end walls adjacent opposite ends of said bed and extending transversely of said bed and upwardly therefrom to retain the hay on said bed;
- a pair of spaced side walls extending longitudinally of said bed and upwardly therefrom to also retain the hay on said bed, said side walls having a length substantially equal to the spacing between said end walls;
- mounting means mounting said side walls for movement transversely of said bed between a first position transversely spaced from said end walls and a second position adjacent said end walls, said mounting means permitting the movement between said first and second positions of said side walls by the livestock as they feed so that the side walls remain closely adjacent the hay as the hay is consumed by the livestock, whereby said bed, end walls and side walls define a container of varying volume for the hay, said mounting means including a first tubular member on each of said end walls and extending transversely of said bed, and second elongate tubular members mounted to and adjacent each end of said side walls and slidably extending into said first tubular member to permit movement of said side walls between said first and second positions; and
- said pair of side walls and said pair of end walls having openings therein to permit access to the hay in said container for feeding of the livestock from outside of said container simultaneously through said side walls and said end walls.

5. The feeder of claim 4, wherein said second elongate tubular members are telescopically received in said first tubular member.

6. The feeder of claim 5, wherein the second elongate tubular members of one side wall are telescopically received in the second elongate tubular members of the other side wall.

7. A hay bale feeder for livestock comprising:
- a bed for supporting hay thereon;
- a pair of spaced end walls adjacent opposite ends of said bed and extending transversely of said bed and upwardly therefrom to retain the hay on said bed;
- a pair of spaced side walls extending longitudinally of said bed and upwardly therefrom to also retain the hay on said bed, said side walls having a length substantially equal to the spacing between said end walls;
- mounting means mounting said side walls for movement transversely of said bed between a first position transversely spaced from said end walls and a second position adjacent said end walls, said mounting means permitting the movement between said first and second positions of said side walls by the livestock as they feed so that the side walls remain closely adjacent the hay as the hay is consumed by the livestock, whereby said bed, end walls and side walls define a container of varying volume for the hay, said mounting means including means to permit at least one end of said side walls to move longitudinally of said bed as said side walls move between said first and second positions; and
- said pair of side walls and said pair of end walls having openings therein to permit access to the hay in said container for feeding of the livestock from outside of said container simultaneously through said side walls and said end walls.

8. The feeder of claim 7, wherein said last mentioned means include first and second substantially vertical members movable transversely toward and away from said bed, said vertical members being spaced from each other by a distance sufficient to slidably receive at least one end of said side walls therebetween.

9. The feeder of claim 8, wherein said last mentioned means also include a hinge for mounting the end of said end wall opposite the slidable end for rotation about a substantially vertical axis.

10. The feeder of claim 7, wherein said last mentioned means include a hinge for mounting at least one end of said side walls for rotation about a substantially vertical axis.

11. A hay bale feeder for livestock comprising:
- a bed for supporting hay thereon;
- a pair of spaced end walls adjacent opposite ends of said bed and extending transversely of said bed and upwardly therefrom to retain the hay on said bed;
- a pair of spaced side walls extending longitudinally of said bed and upwardly therefrom to also retain the hay on said bed, said side walls having a length substantially equal to the spacing between said end walls;
- mounting means mounting said side walls for movement transversely of said bed between a first position transversely spaced from said end walls and a second position adjacent said end walls, said mounting means permitting the movement between said first and second positions of said side walls by the livestock as they feed so that the side walls remain closely adjacent the hay as the hay is consumed by the livestock, whereby said bed, end walls and side walls define a container of varying volume for the hay, said mounting means including means which permits both ends of said side walls to selectively and alternatively slidably move longitudinally of said bed or to rotate about a substantially vertical axis; and
- said pair of side walls and said pair of end walls having openings therein to permit access to the hay in said container for feeding of the livestock from outside of said container simultaneously through said side walls and said end walls.

12. A hay bale feeder for livestock comprising:
- a bed for supporting hay thereon;
- a pair of spaced end walls adjacent opposite ends of said bed and extending transversely of said bed and upwardly therefrom to retain the hay on said bed;
- a pair of spaced side walls extending longitudinally of said bed and upwardly therefrom to also retain the hay on said bed, said side walls having a length substantially equal to the spacing between said end walls;

mounting means mounting said side walls for movement transversely of said bed between a first position transversely spaced from said end walls and a second position adjacent said end walls, said mounting means permitting the movement between said first and second positions of said side walls by the livestock as they feed so that the side walls remain closely adjacent the hay as the hay is consumed by the livestock, whereby said bed, end walls and side walls define a container of varying volume for the hay, said mounting means including a hinge adjacent at least one end of said side walls and releasable restraining means adjacent the other end of said side walls, whereby when said restraining means of at least one side wall is released, said side wall may be rotated about said hinge and a vertical axis to open said side wall horizontally to permit access to the container for loading or unloading said hay; and said pair of side walls and said pair of end walls having openings therein to permit access to the hay in said container for feeding of the livestock from outside of said container simultaneously through said side walls and said end walls.

13. A hay bale feeder for livestock comprising:

a bed for supporting hay thereon;

a pair of spaced end walls adjacent opposite ends of said bed and extending transversely of said bed and upwardly therefrom to retain the hay on said bed;

a pair of spaced side walls extending longitudinally of said bed and upwardly therefrom to also retain the hay on said bed, said side walls having a length substantially equal to the spacing between said end walls;

mounting means mounting said side walls for movement transversely of said bed between a first position transversely spaced from said end walls and a second position adjacent said end walls, said mounting means permitting the movement between said first and second positions of said side walls by the livestock as they feed so that the side walls remain closely adjacent the hay as the hay is consumed by the livestock, whereby said bed, end walls and side walls define a container of varying volume for the hay;

said pair of side walls and said pair of end walls having openings therein to permit access to the hay in said container for feeding of the livestock from outside of said container simultaneously through said side walls and said end walls;

a vehicle including a chassis upon which said bed is supported for movement, said chassis comprising a pair of beams spaced from each other and extending substantially transversely to the direction of movement of the vehicle;

wheels mounted adjacent the ends of said transversely extending beams to rollably support the chassis for such movement;

a pair of longitudinally extending beams spaced from each other and extending between said transversely extending beams and substantially parallel to the direction of movement;

one of said longitudinally extending beams being substantially rigidly fixed adjacent each of its ends to each of said transversely extending beams; and the other of said longitudinally extending beams having at least one of its ends supported upon one of said transversely extending beams for movement relative thereto, whereby when at least one of said wheels encounters a change of elevation of terrain relative to the other of said wheels during movement of the vehicle, the chassis twists about an axis which is substantially parallel to the direction of movement of the vehicle.

14. The feeder of claim 13, wherein at least one of said longitudinally extending beams includes an a longitudinally extending opening therein which extends over a substantial portion of the length of the beam.

15. The feeder of claim 14, wherein said opening comprises a slit in the bottom of the above.

16. The feeder of claim 14, wherein both of said longitudinally extending beams include said opening.

17. The feeder of claim 13, wherein said at least one end of said other of said longitudinally extending beams includes pin means which loosely pins said one end to said one of said transversely extending beams.

18. The feeder of claim 13, wherein both ends of said other of said longitudinally extending beams are supported upon each of said transversely extending beams for movement relative thereto.

19. The feeder of claim 18, including pin means adjacent each of the ends of said other of said longitudinally extending beam which loosely pin the ends to each of said transversely extending beams.

20. The feeder of claim 19, wherein both of said longitudinally extending beams include a longitudinally extending opening therein which extends over a substantial portion of the length of the beams.

21. The feeder of claim 20, wherein said opening comprises a slit in the bottom of the beams.

22. The feeder of claim 18, wherein both of said longitudinally extending beams include a longitudinally extending opening therein which extends over a substantial portion of the length of the beams.

23. The feeder of claim 22, wherein said opening comprises a slit in the bottom of the beams.

24. The feeder of claim 13, wherein the twisting of said chassis permits the wheels to remain at a substantially constant distance beneath said bed when any one of said wheels encounters a change in elevation in terrain.

25. A hay bale feeder for livestock comprising:

a bed for supporting hay thereon;

a pair of spaced end walls adjacent opposite ends of said bed and extending transversely of said bed and upwardly therefrom to retain the hay on said bed;

a pair of spaced side walls extending longitudinally of said bed and upwardly therefrom to also retain the hay on said bed, said side walls each having a top and a bottom, and a length substantially equal to the spacing between said end walls;

mounting means mounting said side walls for movement transversely of said bed between a first position transversely spaced from said end walls and a second position adjacent said end walls, said mounting means permitting the transverse movement of both the top and bottom on said side walls between said first and second positions of said side walls by the livestock as they feed so that the side walls remain closely adjacent the hay as the hay is consumed by the livestock, whereby said bed, end walls and side walls define a container of varying volume for the hay; and said pair of side walls and said pair of end walls having openings therein to permit access to the hay in said container for feeding of the livestock from outside of said container simultaneously through said side walls and said end walls.

26. The feeder of claim 25, including means to permit said side walls to be opened for loading or unloading the hay into or out of the container.

27. The feeder of claim 25, wherein the volume of said container is sufficient to accommodate a plurality of round hay bales supported on said bed in transverse side by side relation to each other when said side walls are in said first position.

28. The feeder of claim 25, including a wheeled vehicle chassis with said bed being mounted thereon, whereby said container with or without said hay therein may be transported from one location to another.

* * * * *